Figure 1:
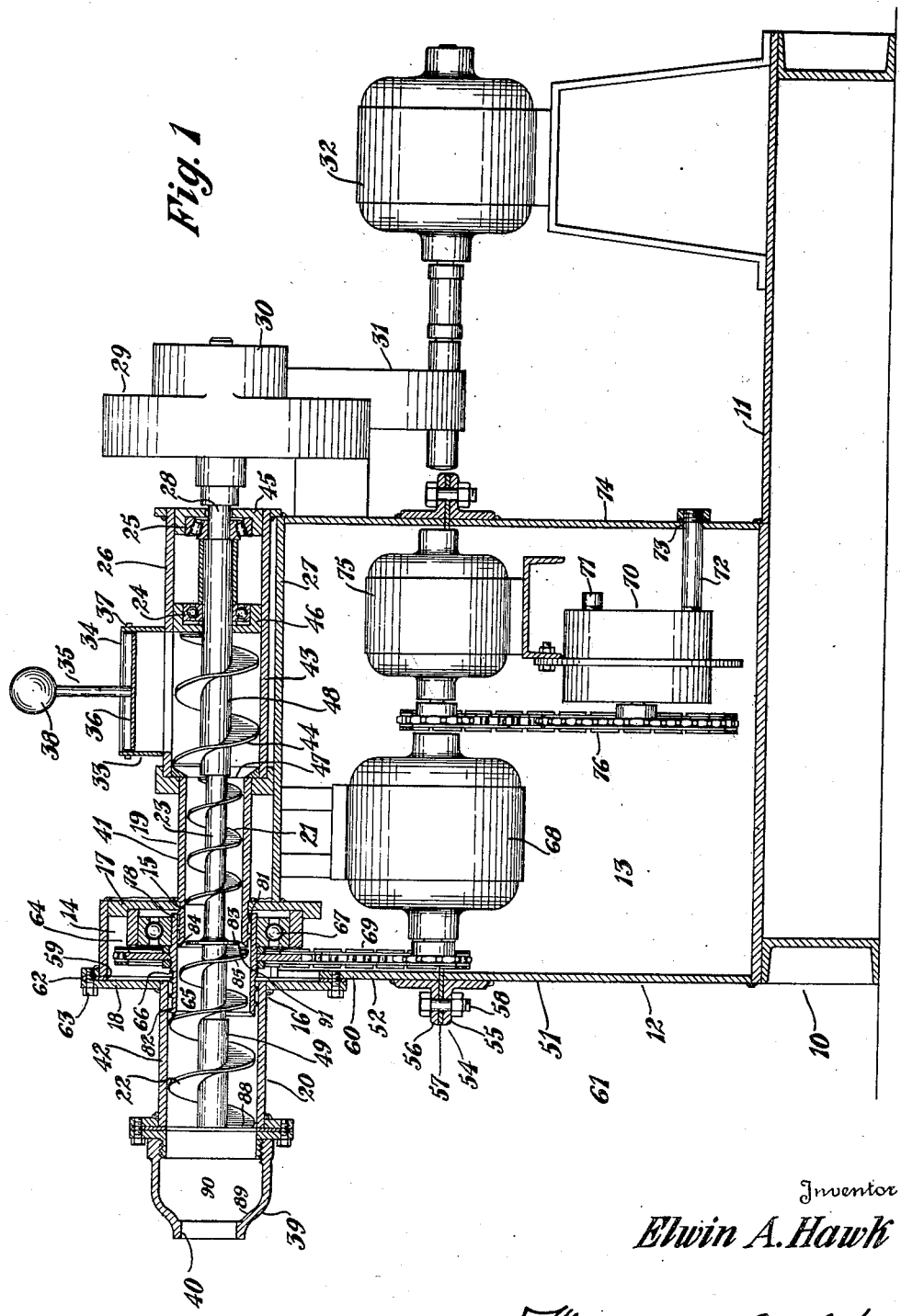

July 7, 1942. E. A. HAWK 2,289,264
METHOD AND APPARATUS FOR DIFFERENTIAL PRESSURE TREATMENT OF MATERIAL
Filed Sept. 18, 1937 3 Sheets-Sheet 1

Inventor
Elwin A. Hawk
By Fraser and Bishop
Attorneys

July 7, 1942.  E. A. HAWK  2,289,264
METHOD AND APPARATUS FOR DIFFERENTIAL PRESSURE TREATMENT OF MATERIAL
Filed Sept. 18, 1937   3 Sheets-Sheet 2
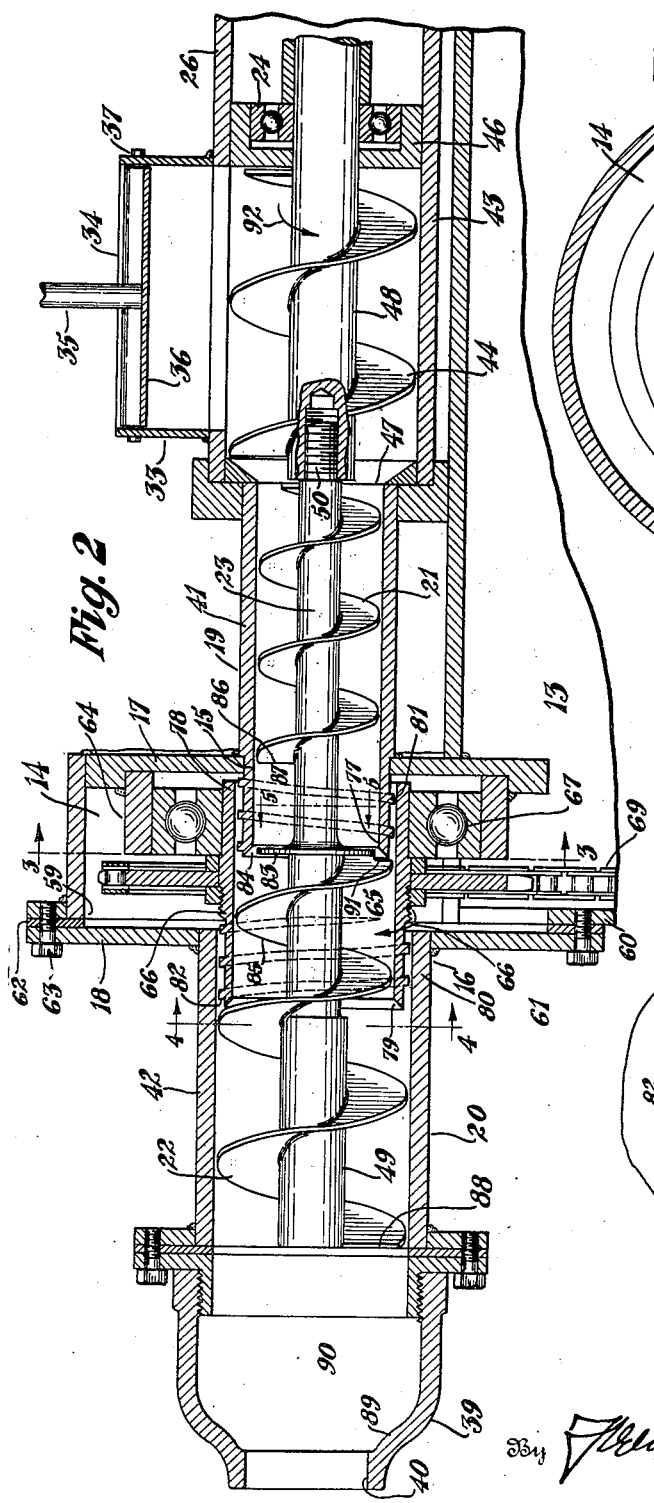
Inventor
*Elwin A. Hawk*

Patented July 7, 1942

2,289,264

UNITED STATES PATENT OFFICE 2,289,264

METHOD AND APPARATUS FOR DIFFERENTIAL PRESSURE TREATMENT OF MATERIAL

Elwin A. Hawk, Canton, Ohio

Application September 18, 1937, Serial No. 164,551

14 Claims. (Cl. 25—14)

My discovery and invention relates to methods and apparatus for differential pressure treatment of material, particularly material which prior to and usually after treatment has been and is subject to the atmosphere, that is to the usual varying atmospheric conditions of the particular location or locations of the material prior to and after treatment.

The discovery and invention is more particularly adapted for the differential pressure treatment of plastic materials such as green ceramic materials, which for example may include clays, shales, and mixtures of the same used in the manufacture of heavy ceramic articles such as brick and tile, and ceramic mixtures such as are used in the manufacture of vitreous and semi-vitreous tableware, and ceramic mixtures such as are used in the manufacture of porcelain such as insulators.

The methods and apparatus of the discovery and invention are not however limited for use in the treatment of any particular material or for any plastic or non-plastic or other condition of the same, but are adapted for use generally in changing the gas content of materials and thereby changing their physical characteristics, and also for otherwise changing the condition or characteristics of material.

In the differential pressure treatment of materials particularly plastic green ceramic materials, the subjecting of comminuted green ceramic mixtures to a sub-atmospheric pressure in a sealed chamber and simultaneously pumping away the low pressure atmosphere in the chamber, has been practiced for many years in various forms of apparatus commonly known as de-airing apparatus.

In certain de-airing apparatus used heretofore, green columns of ceramic mixtures have been introduced into de-airing chambers through sealing dies and have been discharged from the de-airing chambers through sealing dies, the movement of the incoming and discharge columns being usually effected by screw conveyor means. In certain of such apparatus, as the incoming column enters the de-airing chamber, it is subject to the action of shredding or comminuting means, the effects of which are generally to shear or tear particles of the material from the incoming green column so as to facilitate the removal of the gas content thereof in the de-airing chamber, the function of any such apparatus being to produce a homogenized discharged column of green plastic material which is substantially free from gases and thus from seams or folds, which are undesirable and frequently dangerous in finished fired ceramic products made from the same.

A measure of the efficiency of any particular de-airing apparatus which is convenient is the relative plasticity of the de-aired green discharge column.

That is to say the greater the plasticity with respect to tension, compression, or torsion without rupture, the more completely de-aired, degassed, or homogenized the treated material has become.

The methods and apparatus heretofore available for thus treating materials by subjecting the same to differential gas pressures have not been, in the ceramic industry where such methods and apparatus have been largely used, entirely satisfactory from the standpoint of efficiency, nor for the treatment of the complete range of ceramic materials and mixtures which are used in the various branches of the ceramic industry, nor in many cases for the treatment of any particular material or mixture.

Moreover, such apparatus for the differential gas pressure treatment of material have been relatively expensive in first cost, and also in operation and maintenance cost.

Also, such apparatus have been relatively difficult to disassemble for the purpose of making repairs or for the purpose of changing parts for handling various types of materials or mixtures.

Again, many such apparatus have been particularly unsatisfactory due to the plugging up of their de-airing chambers by the comminuted or shredded material passing therethrough, where as is usual gravity has been relied upon to feed the material through the de-airing chambers.

The objects of the present improvements include the provision of improved methods, method steps, and apparatus for the differential pressure treatment of material, in which the material is subject to pressure changes other than gas pressure changes.

Further objects of the present improvements include the provision of improved methods, method steps, and apparatus for the differential pressure treatment of material, in which the material is subject to gas pressure changes.

Further objects of the present improvements include the provision of improved methods, method steps, and apparatus for the differential pressure treatment of material in which the material is subject simultaneously to pressure changes other than gas pressure changes and also to gas pressure changes.

Further objects of the present improvements include the provision of improved apparatus for the differential pressure treatment of material, the apparatus being adapted for relatively low cost production and thus relatively low selling price, and also being adapted for relatively low operation and maintenance cost.

Further objects of the present improvements include the provision of improved apparatus for the differential pressure treatment of material, the apparatus being adapted for easy and rapid disassembly, particularly for facilitating the making of repairs and the changing of parts.

Further objects of the present improvements include the provision of improved apparatus for the differential gas pressure treatment of material, the apparatus having a gas treating chamber in which the material moves and is subject to a gas having a density and thus pressure or a constituency different than the atmosphere, and the gas treating chamber being provided with improved means for preventing plugging thereof by the material moving therein.

Further objects of the present improvements include the provision of improved methods, method steps, and apparatus for reducing the gas content of material, and which, in the case of plastic material, have relatively high efficiencies, that is produce homogenized plastic material of relatively great plasticity, when subject to tension, compression, bending, or twisting forces, or combinations of such forces.

Further objects of the present improvements include the provision of improved general and detail constructions and arrangements of certain parts of the apparatus.

The foregoing and other objects are attained by the methods, method steps, apparatus, parts, combinations, and subcombinations of the present discovery and invention, and the nature of which is set forth in the following general statement, and preferred embodiments of which are set forth in the following description, and which are particularly and distinctly pointed out and set forth in the appended claims forming part hereof, or in claims which may originate herein.

The nature of the improved methods and method steps of the present discovery and invention may be stated in general terms as including in the differential pressure treatment of material having a gas content and having been subject to an initial atmosphere, the method steps including subjecting preferably pieces of the material in a chamber to impact with a surface, and simultaneously causing the gas density and thus pressure of the chamber to be different from that of the initial atmosphere, whereby the impact reduces one or more dimensions of the pieces of material as by flattening and breaking, and the gas content of the material is changed to the extent that substantially all of the voids of the material have a gas density approaching the gas density of the chamber.

The impact pressure treatment of the material is preferably effected with a relatively great velocity and thus impact pressure differential between the material and the impacting surface.

The impact pressure treatment of the material may be preferably effected by a continuously moving high velocity surface.

In certain cases according to the present invention, subjecting moving material to impact with a moving surface with a very great velocity and thus impact pressure differential between the material and the surface provides an improved impact pressure treatment for the material which may not necessarily include subjecting the material to a differential gas pressure treatment.

When plastic material such as a green ceramic body is subject to the improved impact pressure treatment thereof in a chamber sealed from the initial atmosphere from which the material is introduced into the chamber, and the gas content of the chamber is caused to have a density and thus pressure reduced from that of the initial atmosphere, the gas content of the plastic material may be reduced to an extent exceeding that of other usual methods as may be evidenced by a relatively high plasticity of the plastic material thus treated according to the present improvements as compared with the plasticity of the same material treated by usual methods.

In the case of plastic material, the material is preferably introduced into the differential pressure treatment chamber from a compressed mass thereof, as an incoming sealing column, and after passing through the chamber, it is recompressed as a sealing discharge column and usually discharged into the initial atmosphere, the treated material of the discharge column having the desired relatively high plasticity.

Preferably according to the present improvements, the material being subject to pressure treatment in the chamber is positively fed or moved through the chamber.

The nature of the improved apparatus of the present invention may be stated in general terms as including in apparatus for the differential pressure treatment of material, walls forming a differential pressure treatment chamber having an intake opening and a discharge opening, means associated with the intake opening and the discharge opening for sealing the interior of the chamber from the atmosphere about the exterior thereof, which may be termed an initial atmosphere.

Means are provided within the chamber for subjecting material therein which has been subject to the initial atmosphere to impact with a surface, there being a relatively high velocity differential between the surface and the material as it moves in the chamber, and the surface preferably being a moving surface and preferably the interior surface of a continuously moving open ended preferably cylindric tube.

Means are preferably provided for simultaneously causing the gas density and thus pressure of the chamber to be different than that of the initial atmosphere as by pumping away the gas content of the chamber.

Positive feed means are preferably provided, as a screw conveyor, for feeding the material through the impact pressure treating tube crosswise of and toward the impacting surface.

In the case of plastic materials, means for introducing the material into the chamber, preferably include a sealing screw press operatively associated with the inlet opening of the chamber, the material being introduced into the chamber as a compressed incoming column; and means are provided for discharging the treated plastic material from the chamber as a compressed discharge column, including preferably screw press and die discharge means associated with the discharge opening of the chamber.

The apparatus furthermore includes improved general and detail arrangements of certain parts, as hereinafter set forth and claimed.

Figure 7:
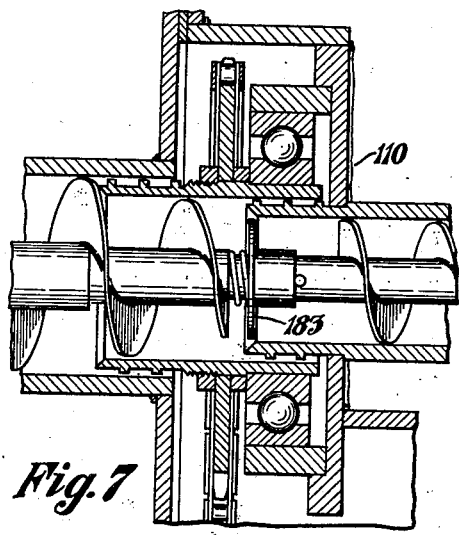
Figure 8:
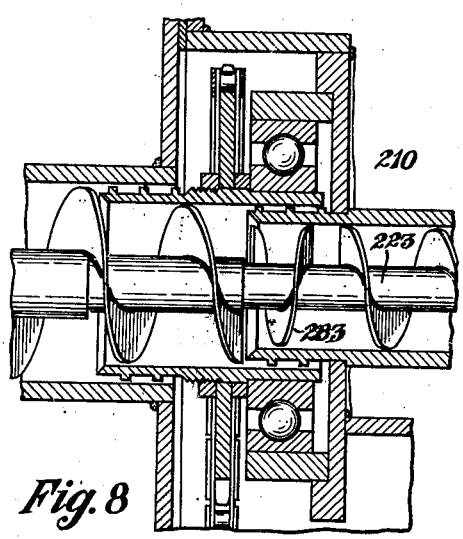
Figure 9:
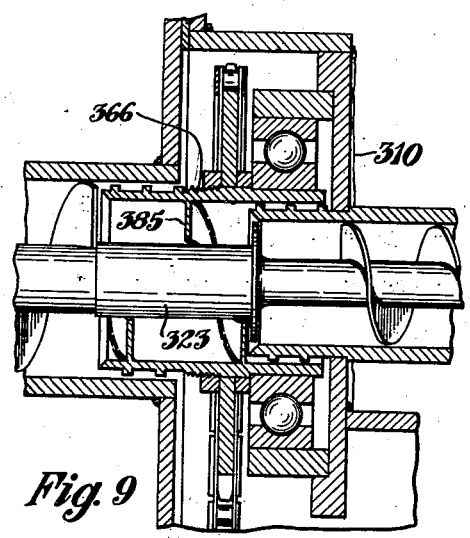
Figure 10:
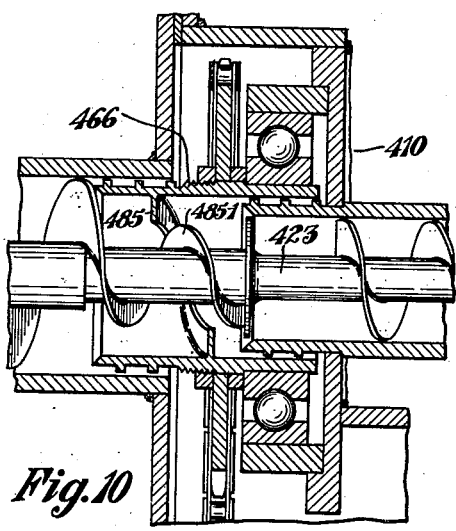
Figure 6:
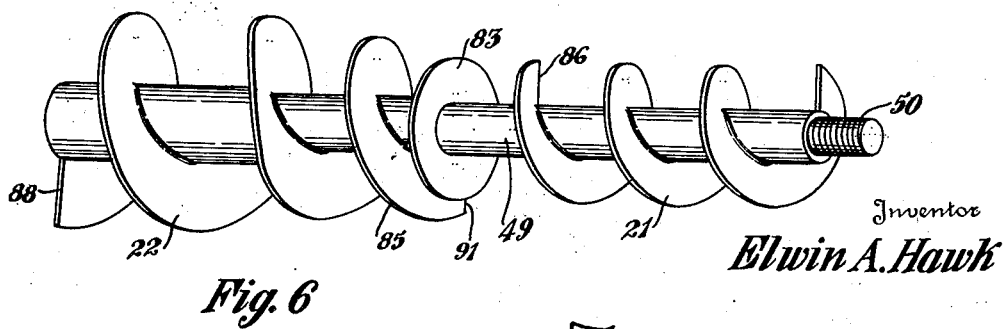

By way of example, several embodiments of the improved machines hereof each adapted for carrying out the improved method and/or method steps hereof are illustrated in the accompanying drawings forming part hereof, in which Figure 1 is a vertical longitudinal sectional view of one embodiment of the improved apparatus hereof;

Fig. 2, an enlarged fragmentary view of portions thereof;

Fig. 3, a fragmentary transverse sectional view thereof as on line 3—3, Fig. 2;

Fig. 4, a fragmentary transverse sectional view thereof as on line 4—4, Fig. 2;

Fig. 5, a fragmentary transverse sectional view thereof as on line 5—5, Fig. 2;

Fig. 6, a detached oblique view of one portion of the preferred improved screw conveyor for the apparatus;

Fig. 7, a fragmentary view similar to Fig. 2 illustrating a second embodiment of the improved apparatus;

Fig. 8, a similar view illustrating a third embodiment of the improved apparatus;

Fig. 9, a similar view illustrating a fourth embodiment of the improved apparatus; and Fig. 10, a similar view illustrating a fifth embodiment of the improved apparatus.

Similar numerals refer to similar parts throughout the drawings.

One embodiment of the improved apparatus hereof is illustrated in Figs. 1 to 6 inclusive and indicated generally by 10, and includes a base 11 which supports walls indicated generally by 12 which form a chamber 13 in which is carried out the differential pressure treatment of material according to the improved methods hereof, by the improved apparatus 10.

The chamber 13, in the apparatus 10, includes an upper extension 14 which is the particular part of the chamber where material is treated by the apparatus 10.

The walls 12 of the chamber 13 and its upper extension 14 are gas tight, and an inlet opening indicated by 15 and an outlet opening indicated by 16 are provided for the chamber 13, said openings 15 and 16 in the apparatus 10 being located respectively in spaced parallel walls 17 and 18 of the treatment chamber upper extension 14.

For the general purposes of the present improvements, the inlet and outlet openings 15 and 16 each have associated therewith sealing closure means, which in the apparatus 10 are in the form of input gas sealing screw conveyor press means 19 associated with the inlet opening 15 and arranged to feed an incoming column of plastic material through the inlet opening 15 into the treatment chamber upper extension 14, and gas sealing discharge screw conveyor press means indicated generally by 20 associated with the discharge opening 16 and arranged to produce a gas sealing discharge column of plastic material after the same has been subject to treatment in the treatment chamber upper extension 14.

It is to be understood that the inlet and discharge openings 15 and 16 may be provided with closure doors, and the material may be handled in batches in the treating chamber 13, but the apparatus 10 as shown is a preferred embodiment adapted for continuously treating plastic material, with a continuous incoming column of untreated plastic material being introduced into the treatment chamber upper extension 14 and a continuous discharge column of treated material being discharged from the treatment chamber upper extension 14.

Preferably the screw conveyor press means 19 and the screw conveyor press means 20 are coaxial with each other so that the screws 21 and 22 thereof respectively may be located on different portions of the same shaft 23, which is preferably as shown journalled at its end adjacent the input screw conveyor press means 19 as by spaced anti-friction bearing means 24 and 25 which are operatively mounted in a bearing box 26 supported on an upper wall 27 of the chamber 13.

The extremity 28 of the shaft 23 extends beyond the bearing box 26 and is operatively connected in the apparatus 10 with a change speed drive gearing indicated generally by 29 which is contained within a housing 30 and is driven as by a belt 31 by a screw conveyor drive motor 32 which is mounted on the base 11.

The screw conveyor press means 19 includes walls forming an inlet hopper indicated generally by 33 having an upper inlet opening 34 which may be provided with pressure closure means 35 which as shown are in the form of a door 36 hinged at one side 37 thereof upon one of the hopper walls forming the inlet opening 34 and having a mass 38 mounted on its upper face so as to normally urge the door 36 downward.

The discharge screw conveyor press means 20 includes discharge die 39 having a discharge die opening 40.

The input screw 21 as shown operates in a tubular housing 41, and the discharge screw 22 operates in a tubular housing 42.

The bearing box 26 and the hopper 33 are formed in part as shown by a tubular housing 43.

The tubular housings 43, 41, and 42 as shown and preferably are coaxial with each other and their opposite adjacent ends open into or towards each other.

As shown, the tubular housings 43, 41, and 42 are cylindric. The housings 43 and 42 have substantial equal diameters, and the housing 41 has a diameter less than that of the housings 43 and 42. Within the hopper housing 43 as shown there is provided a hopper screw 44 on the shaft 23.

The bearing box portion 26 of the housing 43 preferably as shown has a removable cylindric end closure 45 associated with the anti-friction bearing means 25, and the anti-friction bearing means 24 is associated with a removable cylindric intermediate closure 46, and the shaft 23 is preferably separably connected at the plane 47 of junction between the adjacent ends of the tubular housings 43 and 41.

As shown, the shaft 23 includes a hopper section 48 and a material treating section 49 which are separably connected at the plane 47 as by screw joint means indicated generally by 50, and best shown in Figs. 2 and 6.

For simplified assembly and maintenance, by rendering easily accessible the parts of the apparatus 10 located within the chamber of housing walls, the walls 12 forming the treatment chamber 13, as shown are in the form of a lower upwardly opening box or case section 51 and an upper downwardly opening box or case section 52, the opposite openings of the sections 51 and 52 registering with each other and being connected with each other by gasket sealed flange and bolt means indicated generally by 54, there being an outwardly extending peripheral flange 55 about the upper opening of the section 51 and an outwardly extending peripheral flange 56 about the downward opening of the section 52, with a gasket 57 interposed between opposite faces of the flanges 55 and 56 and with a plurality of clamping bolts and nuts 58 having the bolt shanks extending through suitable registering apertures in the flanges and the gasket, and serving to seal clamp the same in a usual manner.

By constructing the treatment chamber 13 with the upper and lower separable sections 51 and 52, separation of these sections 51 and 52 provides for the easy assembly and maintenance of the parts of the apparatus located within the relatively large treatment chamber 13 below the upper wall 27 thereof and its upper extension 14.

Likewise for attaining ease of assembly and maintenance, by easy accessibility, the wall 18 of the treatment chamber upper extension 14 as shown is in the form of an annular disk which extends over an annular opening 59 in the wall 60 of the treatment chamber upper extension 14 at the discharge side 61 of the apparatus, and the annular disk wall 18 has an annular sealing gasket 62 interposed between its outer periphery and the wall 60 about the opening 59, and screw means 63 are provided for separably seal clamping the wall 18 over the opening 59 of the chamber wall 60.

By so constructing the chamber extension 14 with the separable annular disk wall 18, when the annular disk wall 18 with the tubular housing 42 secured to and extending therefrom and mounting the discharge die 39 are removed from the treatment chamber wall 60, the treatment section 49 of the shaft 23 and the screw and other means secured thereto may be removed by unscrewing the treatment section 49 of the shaft 23 from the hopper section 48 thereof, and the treatment section 49 may be then separated by pulling away from the hopper section 48, whereas the hopper section 48 and the bearings therefor may be removed endwise from the tubular housing 46, by pulling the same in the direction away from the tubular housing 41.

In Fig. 6, the treatment section 49 of the shaft 23 and parts attached thereto are illustrated removed from the apparatus.

When the annular chamber wall 18 and attached parts are removed easy access may also be had to the parts located within the treatment chamber upper extension 14.

The apparatus 10 furthermore includes improved impact pressure treatment means indicated generally by 64, which are preferably located within the gas sealed treatment chamber 13, as shown in the upper extension 14 thereof.

The improved impact pressure treatment means 64 are constructed and arranged for subjecting material passing therethrough to a relatively great impact pressure.

For this purpose the impact pressure treatment means 64 includes an impacting surface 65 moving preferably at a relatively high velocity and against which strikes the material being treated, the material having a relatively low velocity when it strikes the impacting surface 65, and thus there is a relatively great velocity differential between the impacting surface 65 and the material being treated as the same strikes the impacting surface 65, and consequently a relatively great impact pressure is applied to the material as it strikes the preferred high velocity impacting surface 65.

The desired relatively great velocity differential between the impacting surface and the material being treated as it strikes the same, is more conveniently and preferably attained by providing a high velocity for the impacting surface 65 and a relatively low velocity for the material being treated prior to and at impact, although it is obvious that a velocity differential may be attained by providing a low velocity for the impacting surface and a high velocity for the material being treated prior to and at impact.

The impacting surface 65 preferably moves continuously in one direction and is preferably and as shown, the inner cylindric surface of a rotary cylindric tube 66 which is operatively interposed within the treatment chamber upper extension 14 between and coaxial with the tubular housings 41 and 42, opposite ends of the tube 66 being telescoped with respect to the adjacent ends of the housings 41 and 42, and otherwise constructed and arranged with the same as and for the purposes hereinafter set forth in detail.

The rotary tube 66 is journal mounted on the wall 17 of the treatment chamber upper extension 14 as by single anti-friction bearing means 67. Means for rotating the rotary tube 66 are preferably provided as shown by means of a tube drive motor 68 operatively mounted within the treatment chamber 13 and provided with a chain gear drive connection indicated generally by 69 with the rotary tube 66.

Also within the treatment chamber 13 in the apparatus 10 there is operatively mounted a gas pump indicated generally by 70 having an intake duct 71 communicating with the chamber 13 and its upper extension 14 and a discharge duct 72 extending through a gas sealed opening 73 formed in one of the walls 74 of the chamber 13.

For the purpose of homogenizing plastic material, the pump 70 may be a vacuum pump and by way of example is so described hereafter.

Drive means for the pump 70 as shown and preferably are in the form of a pump drive motor 75 located within the chamber 13 and having a chain gear drive connection indicated generally by 76 with the pump 70.

Operation of the vacuum pump 70 serves to pump away the gas content of the treatment chamber 13 and its upper extension 14, or in other words to reduce the gas density and pressure within the chamber 13 and its upper extension 14 with respect to the density and pressure of the atmosphere external of the gas sealed walls of the chamber 13 and its upper extension 14, which atmosphere may be termed an initial atmosphere and which ordinarily is the usual atmosphere of the earth at the particular location of the apparatus 10.

In the apparatus 10, as best shown in Fig. 2, the discharge end 77 of the tube housing 41 telescopes within the intake end 78 of the rotary tube 66; and the discharge end 79 of the rotary tube 66 telescopes within the intake end 80 of the tube housing 42.

Gas passageway and material obstructing means are provided between the telescoped tube ends 77 and 78, and 79 and 80, as by square threads 81 formed externally on the tube housing end 77 within the rotary tube end 78, and by square threads 82 formed externally on the rotary tube end 79 within the tube housing end 80; as shown the pitch of the threads 81 and 82 being opposite, and there being preferably a minimum clearance between the peripheries of the threads 81 and 82 and the tubular surfaces within which they are located.

By thus providing the threads 81 and 82, passage of gas is attained between the interior of the rotary tube 66 and the treatment chamber upper extension 14 and the treatment chamber 13, but material is prevented from passing between either of the telescoped tube ends into the treatment chamber upper extension 14 and the treatment chamber 13.

Obstructing means are provided on the shaft 23 aligned substantially with the extremity of the discharge end 77 of the tubular housing 41, in the apparatus 10 as shown in the form of an annular disk flange 83 whose diameter, as best shown in Fig. 2, is such that there is a relatively narrow annular discharge opening 84 between the periphery of the obstructing disk 83 and the inner surface of the discharge end 77 of the tubular housing 41.

Minimum practical mechanical clearance is preferably provided between the peripheries of the several conveyor screws on the shaft 23, and it will be noted that the discharge conveyor screw 22 extends in a reduced diameter within the rotary tube 66 as a material moving screw 85, the relative diameters of the material moving screw 85 and the discharge screw 22 being best shown in Figs. 2, 4, 5, and 6.

The material input screw 21 terminates within the tubular housing 41 at a transverse plane 86 spaced from the obstruction disk 83 and forming a gas sealing annular compartment 87 therebetween which is adapted in the operation of the machine to be filled with a gas sealing annular plug of the plastic material being treated by the apparatus 10.

Similarly the discharge screw 22 terminates at a transverse plane 88 spaced from the opening 40 of the discharge die 39; and the discharge die 39 has an obstructing neck 89, and a gas sealing compartment 90 is thus formed between the obstructing neck 89 and the extremity of the discharge screw 22 at the plane 88 spaced from the neck 89, the compartment 90 being adapted to be filled with a gas sealing plug of the material which has been treated by the apparatus 10, during operation of the same.

The extremity of the material moving screw 85 at the transverse plane 91 adjacent the discharge end 77 of the tubular housing 41 is preferably relatively close to the extremity of the discharge end 77 so as to shear off pieces of material issuing through the annular discharge opening 84 into the interior of the rotary tube 66.

In the operation of the apparatus 10 the rotary tube 66 is rotated preferably in a direction which may be as indicated by the arrow 66' opposite to the direction of rotation of the screw shaft 23 which may be as indicated by the arrow 92, thereby effecting a greater velocity differential between the inner impacting surface 65 of the rotary tube 66 and the surfaces of the material moving screw 85, than if the tube 66 and screw 85 are rotated in the same direction.

The speed of rotation of the tube 66 is relatively high, as for example 600 R. P. M., whereas the speed of rotation of the shaft 23 and thus of the screw 85 thereon may be relatively low, as for example 60 R. P. M. Consequently the velocity differential between the impacting surface 65 of the tube 66 and the surfaces of the material moving screw 85 is 660 R. P. M. With a relatively low rotary speed of the screw 85, the material being positively moved thereby through the rotary tube 66 is moved in the direction of the longitudinal axis of the shaft 23 towards the discharge screw conveyor press means 20 at a speed sufficiently slow to provide a sufficient period of time in which to effect the impact pressure treatment of the material in the tube 66.

As above stated, the apparatus 10 as shown and described is arranged for homogenizing or de-gasifying plastic material such as a green ceramic mixture, in which case the gas content of the chamber 13 and its upper extension 14 and the space in and about the impact pressure treatment means 64 is continuously pumped away by the vacuum pump 70, whereby the gas density and pressure within the chamber 13 and its upper extension 14 and the space in and about the impact pressure treatment means 64 is reduced from that of the initial atmosphere externally of the apparatus 10.

It is to be understood that the apparatus 10 operates in a usual manner in gas sealing the interior of the rotary tube 66 beyond the ends thereof by the gas sealing plugs of plastic material formed in the compartments 87 and 90 respectively.

The plastic material being treated by the apparatus 10 is fed through the upper opening 34 into the hopper 33, wherein the hopper screw 44 serves to compress and pug the same in a usual manner and advance the material to the input gas sealing screw conveyor press means 19 which compresses the incoming column of plastic material against the obstructing disk 83 and forms partment 87 and advances a tubular column of untreated material through the annular opening treated material through the annular opening 84 which is the discharge opening of the tubular housing 41 and the inlet opening of the treatment compartment within the rotary tube 66.

In a similar usual manner, plastic material having been treated within the rotary tube 66, is compressed by the gas sealing discharge screw conveyor press means 20, formed in the compartment 90 as a gas sealing plug, and discharged as a highly homogenized column from the discharge die opening 40.

Within the interior treatment compartment of the rotary tube 66, the incoming tubular column of material breaks and is broken into pieces which are positively moved longitudinally of the shaft 23 by the material moving screw 85 toward the discharge screw press means 20, and the pieces of material during their longitudinal movement through the rotary treatment tube 66 strike against the high velocity impacting rotary surface 65. In other words the screw conveyor means 85 moves the pieces of material cross-wise of and toward the rotary impact surface 65.

The velocity differential between the velocity of the pieces of material just prior to impact and that of the surface 65 is relatively great, so that the impact pressure applied or subjected upon the striking pieces of material is relatively great, serving to flatten the pieces and reduce the thickness thereof and further break-up the same, whereby their gas content is reduced to a minimum by the pumping away of the gas content of the chamber 13, its upper extension 14, and the interior of the rotary tube 66, as aforesaid.

The homogenized discharge column issuing from the die opening 40 of the discharge die 39 has relatively great plasticity, as compared with the plasticity of the same material when treated by other homogenizing apparatus heretofore available.

In Fig. 7 is illustrated a second embodiment of the improved apparatus indicated generally by 110 and which is generally similar to the embodiment 10, with the exception that in the apparatus 110, a spring pressed obstructing disk 183 is provided for yieldingly resisting plastic material of varying stiffness.

In Fig. 8 is illustrated a third embodiment of the improved apparatus indicated generally by 210 and which is generally similar to the apparatus 10, with the exception that in the apparatus 210 the obstructing means 283 on the shaft 223 are in the form of a length of screw having a pitch opposite to the remaining screws on the shaft 223.

In Fig. 9 is illustrated a fourth embodiment of the improved apparatus indicated generally by 310 and which is generally similar to the apparatus 10, with the exception that in the apparatus 310 screw means 385 are provided on the rotary tube 366, and not upon the shaft 323.

In Fig. 10 is illustrated a fifth embodiment of the improved apparatus indicated generally by 410 and which is generally similar to the apparatus 10, with the exception that in the apparatus 410 the rotary tube 466 has provided therein a screw 485 and the shaft 423 has also provided thereon screw means 485—1, the screw 485 and 485—1 having mechanical clearance between each other.

Each of the embodiments 10, 110, 210, 310, and 410 of the present improvements are illustrated and described herein by way of example, and the scope of the present invention is not limited to the same or to the particular details thereof, but is commensurate with any and all novel subject matter contained herein which may at any time properly under the United States patent laws be set forth in the claims hereof or originating herein, and the elements of any such claims are intended to include their reasonable functional and/or structural equivalents.

I claim:

1. In apparatus for the pressure treatment of material, a rotary tubular member having an inner rotary impact surface, and screw conveyor means operative within the rotary member, the screw conveyor means including a shaft and a screw on the shaft having outer rotary impact surfaces opposed to the inner impact surface of the tubular member, the periphery of the screw being closely adjacent the inner rotary surface of the tubular member, means for rotating the tubular member, and means for introducing pieces of material between the opposed impact surfaces of the screw and the tubular member, and means forming a gas sealed chamber enclosing the tubular member and the screw conveyor means and the material introducing means, and means for varying the gas content of the chamber.

2. In apparatus for the pressure treatment of material, a rotary tubular member having an inner impact surface and a separate screw conveyor and impact means within the rotary tubular member, and means forming a gas sealed chamber enclosing the rotary tubular member and the screw conveyor means, and means for varying the gas content of the chamber.

3. In apparatus for the pressure treatment of material, two relatively rotatable impact members having opposed impact surfaces, one of the members being tubular, gas sealed walls forming a chamber enclosing the impact members, means for causing relative rotation of the members, the chamber walls having an inlet opening and a discharge opening, gas sealing plastic material input screw conveyor press means including a tube extending from the inlet opening and telescoping within one end of the tubular member, and gas sealing plastic material discharge screw conveyor press means including a tube telescoping over the other end of the tubular member and extending to the outlet opening, the material input means and discharge means including means arranged to deliver and receive material to and from the interior of the tubular impact member.

4. In apparatus for the pressure treatment of material, two relatively rotatable impact members having opposed impact surfaces, one of the members being tubular, gas sealed walls forming a chamber enclosing the impact members, means for causing relative rotation of the members, the chamber walls having an inlet opening and a discharge opening, gas sealing plastic material input screw conveyor press means associated with the inlet opening and telescoping within one end of the tubular member, and gas sealing plastic material discharge screw conveyor press means including a tube telescoping over the other end of the tubular member and extending to the outlet opening, the material input means and discharge means including means arranged to deliver and receive material to and from the interior of the tubular impact member, and means for causing the gas pressure and density of the chamber to be different than the gas pressure and density externally thereof.

5. In the differential pressure treatment of green ceramic material, the method steps which include forming a mass of the green ceramic material, introducing the mass of material into a rotary tubular member in and communicating with a gas sealed chamber, forming pieces of the material from the mass in the tubular member, flattening the pieces of material by positively moving the pieces through the rotary tubular member in the chamber and simultaneously causing successive impacts of the pieces against inner impact surfaces of the tubular member, changing the gas content of the chamber, reforming a mass of the material from the pieces leaving the tubular member, and discharging the re-formed mass of the material from the chamber.

6. In the differential pressure treatment of material, the method steps which include introducing pieces of material into a rotary tubular member in and communicating with a gas sealed chamber, flattening the pieces of material by positively moving the pieces through the rotary tubular member in the chamber and simultaneously causing successive impacts of the pieces against inner impact surfaces of the tubular member, changing the gas content of the chamber, and discharging the material from the tubular member and the chamber.

7. In apparatus for the pressure treatment of material, two relatively rotatable members having opposed impact surfaces, one of the members being tubular and the other member extending through the tubular member and including means for feeding material through the tubular member, means forming a gas sealed chamber enclosing the members, means within the chamber for delivering material into the interior of the tubular member and means for receiving material from the tubular member.

8. In apparatus for the pressure treatment of material, two relatively rotatable members having opposed impact surfaces, one of the members being tubular and the other member extending through the tubular member and including means for feeding material through the tubular member, means forming a gas sealed chamber enclosing the members, means including a tube within the chamber telescoping with one end of the relatively rotatable tubular member for delivering material into the interior of the tubular member, and means including a tube telescoping with the other end of the relatively rotatable tubular member for receiving material from the interior of the tubular member.

9. In apparatus for the pressure treatment of plastic material for changing the gas content thereof and the like, walls forming a gas sealed chamber having an intake opening and a discharge opening, means for changing the gas content of the chamber, a rotary tube operatively mounted within the chamber, an intake tube extending from the intake opening of the chamber and telescoping with one end of the rotary tube, and a discharge tube extending from the discharge opening of the chamber and telescoping with the other end of the rotary tube, and means for delivering a plug seal forming column of plastic material into the intake tube, and means for conveying the plastic material through the intake tube and the rotary tube and the discharge tube, and means coacting with the discharge tube for forming a plug seal of the plastic material conveyed thereinto and a discharge column of the plastic material therefrom.

10. In apparatus for the pressure treatment of plastic material for changing the gas content thereof and the like, walls forming a gas sealed chamber having an intake opening and a discharge opening, means for changing the gas content of the chamber, a rotary tube operatively mounted within the chamber, an intake tube extending from the intake opening of the chamber and telescoping with one end of the rotary tube, and a discharge tube extending from the discharge opening of the chamber and telescoping with the other end of the rotary tube, and means operative between each telescoped tube end in association with the rotary tube for providing a gas passageway into the interior of the rotary tube and for obstructing flow of material from the interior of the rotary tube between the telescoped tube ends, and means for delivering a plug seal forming column of plastic material into the intake tube, and means for conveying the plastic material through the intake tube and the rotary tube and the discharge tube, and means coacting with the discharge tube for forming a plug seal of the plastic material conveyed thereinto and a discharge column of the plastic material therefrom.

11. In apparatus for the pressure treatment of plastic material for changing the gas content thereof and the like, walls forming a gas sealed chamber having an intake opening and a discharge opening, means for changing the gas content of the chamber, a rotary tube operatively mounted within the chamber, an intake tube extending from the intake opening of the chamber and telescoping with one end of the rotary tube, and a discharge tube extending from the discharge opening of the chamber and telescoping with the other end of the rotary tube, and thread means operative between each telescoped tube end in association with the rotary tube for providing a gas passageway into the interior of the rotary tube and for obstructing flow of material from the interior of the rotary tube between the telescoped tube ends, and means for delivering a plug seal forming column of plastic material into the intake tube, and means for conveying the plastic material through the intake tube and the rotary tube and the discharge tube, and means coacting with the discharge tube for forming a plug seal of the plastic material conveyed thereinto and a discharge column of the plastic material therefrom.

12. In apparatus for the pressure treatment of material and the like, a rotary tube, means external of the rotary tube operatively mounting the rotary tube for rotation, means for rotating the tube, an intake tube telescoping with one end of the rotary tube, and a discharge tube telescoping with the other end of the rotary tube, and thread means operative between each telescoped tube end in association with the rotary tube for obstructing flow of material from the interior of the rotary tube between the telescoped tube ends, and means for conveying material through the intake tube and the rotary tube and the discharge tube.

13. The method of pressure treatment of plastic material including introducing from an initial atmosphere a column of plastic material into a chamber, breaking the column of material into pieces, flattening the pieces by introducing them into a rotating tube within the chamber, simultaneously causing the gas pressure and content of the chamber to be different than that of the initial atmosphere, and removing the material from the tube and the chamber.

14. The method of pressure treatment of plastic material in a gas sealed chamber having a rotary tube therein, including introducing pieces of the material into the rotary tube and flattening the pieces by rotating the tube, and simultaneously changing the gas pressure and content of the chamber.

ELWIN A. HAWK.